(12) United States Patent
Arihara

(10) Patent No.: US 8,154,682 B2
(45) Date of Patent: Apr. 10, 2012

(54) BACKLIGHT UNIT AND LIQUID CRYSTAL DISPLAY DEVICE HAVING THE SAME

(75) Inventor: Tsutomu Arihara, Saitama (JP)

(73) Assignee: Toshiba Mobile Display Co., Ltd., Tokyo (JP)

( * ) Notice: Subject to any disclaimer, the term of this patent is extended or adjusted under 35 U.S.C. 154(b) by 138 days.

(21) Appl. No.: 12/647,274

(22) Filed: Dec. 24, 2009

(65) Prior Publication Data

US 2010/0188599 A1   Jul. 29, 2010

(30) Foreign Application Priority Data

Dec. 25, 2008   (JP) .................................. 2008-331308

(51) Int. Cl.
*G02F 1/1333* (2006.01)
(52) U.S. Cl. ................................ 349/60; 349/58; 349/65
(58) Field of Classification Search .......................... None
See application file for complete search history.

(56) References Cited

U.S. PATENT DOCUMENTS

2006/0170839 A1* 8/2006 Yamamoto et al. ............. 349/58
2006/0203515 A1* 9/2006 Fujikawa et al. ............. 362/615

FOREIGN PATENT DOCUMENTS

| JP | 2003-215546 | 7/2003 |
|----|-------------|--------|
| JP | 2008-097877 | 4/2008 |

* cited by examiner

*Primary Examiner* — Thanh-Nhan P. Nguyen
(74) *Attorney, Agent, or Firm* — Finnegan, Henderson, Farabow, Garrett & Dunner, L.L.P.

(57) ABSTRACT

A backlight unit comprising: a quadrilateral light guide plate 4; and a substrate 3 comprises a plurality of light-emitting diodes 2; and an inner frame 8 which surround the light guide plate 4; and an outer frame 7 which surround the inner frame 8 and the substrate 3; a plurality of rubber members 9; wherein a side of the inner frame 8 is opposite to the light-emitting diodes 2, and two corners are formed edges of the side; and the rubber member 9 is placed the each corners; and wherein the rubber member 9 comprises a cylindrical part; and wherein the cylindrical part is projected inside of the inner frame 8.

7 Claims, 8 Drawing Sheets

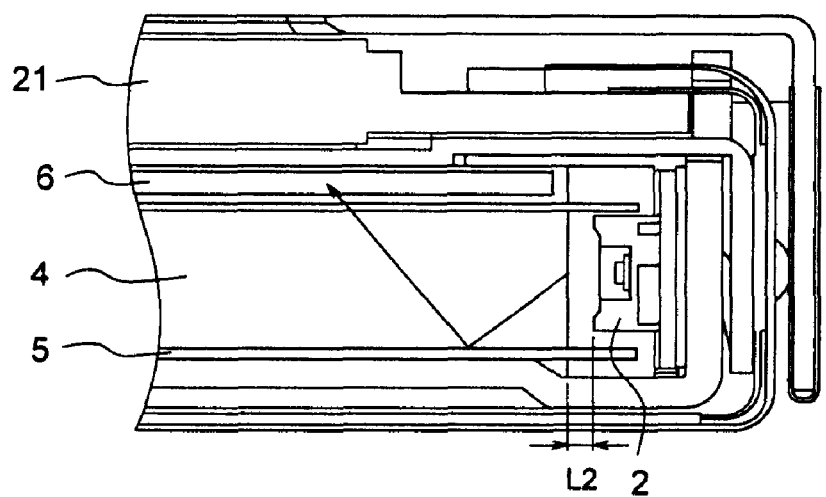

BACKLIGHT UNIT AND LIQUID CRYSTAL DISPLAY DEVICE HAVING THE SAME

BACKGROUND OF THE INVENTION

1. Field of the Invention

The present invention relates to a backlight unit as surface light source function and particularly improvement of support structure for light guide plate, and further the present invention relates to a crystal display device having the same.

2. Description of the Prior Art

In recent years, as the display devices of such information machines as laptop personal computers and word processors and the display devices of such image machines as portable television sets, video movies, and car navigation systems, the liquid crystal display (LCD) devices have come to be used in more cases than not with a view to utilizing such features as lightness, thinness, and low power consumption. For the most part, these liquid crystal display devices having a backlight unit such as a lighting unit throw a light on a liquid crystal display panel from behind.

Lighting method of backlight unit is classified an edge light method and a direct under light method. An edge light method which comprises placing a light guide plate behind a display element, and output a point light using as a LED (light-emitting diode) or a linear light using as a fluorescent discharge tube, for example. A direct under light method which comprises placing a light diffuser plate behind a display element, and output plural linear light using as plural fluorescent discharge tubes, for example. Generally, an edge light method is better than a direct under light method, concerning thin thickness body. Thus, an edge light method is suitable for personal digital assistance (PDA), and laptop personal computer.

A backlight unit used an edge light method that needs holding a light guide plate and a light part by a frame belongs to the backlight unit. For example, a light guide plate sandwiched between the frame and a back cover belongs to the backlight unit is proposed. For example, a light guide plate fixed to the frame by double-sided adhesive tape is proposed. The light guide plate sandwiched structure is preferable, because it doesn't use additional double-sided adhesive tape and easy to assemble.

As above structure that needs setting the light guide plate near the light part. The light guide plate approximate to the light part, it can be inducing a light of the light part to the light guide plate high efficiency, and prevent to uneven luminance occurs.

Therefore, prior art proposed that the frame having a press-supporting part (See JP2003-215546A). Prior art JP2003-215546A is disclosed a LCD device having a plastic frame which enclosed a light guide plate and a LED; wherein the plastic frame comprises a elastic press-supporting part such as a plastic spring; wherein the press-supporting part is formed on a edge of the frame and the edge is opposite to the LED, and the press-supporting part press the light guide plate to the LED.

However, in the above method by using the prior art JP2003-215546A, it is easy to occur pressing defective at the press-supporting part under wide temperature range of external environment. The plastic frame comprises the plastic spring part is sensitive temperature changes. The plastic frame is easy to stretch and deform by temperature changes. Function of the press-supporting part is damaged by the plastic frame stretched or the plastic frame deformed. That is, the light guide plate is pressed by the press-supporting part under the room temperature, but the press-supporting part is deformed by temperature raised and the press-supporting part couldn't press to the light guide plate, then the light guide plate is easy to move inside of the plastic frame. Backlash of the light guide plate is significantly impairing the commercial value and image disqualify such as uneven luminance occurs. For example, the LCD device having the prior art structure and installed a car navigation system, backlash of the light guide plate occurs and image disqualify such as uneven luminance occurs. Because, the room temperature of the car sometimes rising high temperature.

As structure of prior art JP2003-215546A which comprises a frame having a press-supporting part such as a plastic spring and press and support to the light guide plate. It is necessary to set the plastic springs on each side of the plastic frame for pressing as horizontally and vertically if keep stable supporting condition. But, it is difficult to assemble the light guide plate into the plastic frame when the plastic springs are set on each side of the plastic frame. In case of the plastic springs are set on horizontally sides or the plastic springs are set on vertically sides, the position of the light guide plate is unsettled. Therefore, the LCD device having the prior art structure occurs image disqualify.

The present invention has been proposed in view of the conventional actual situation, and the object thereof is to provide a backlight unit which structure is certain pressing the light guide plate to the light part such as LED without being influenced by external environment, and prevent to occurs image disqualify such as uneven luminance and easy to assemble the light guide plate. In addition, the object thereof is to provide a liquid crystal display (LCD) device having the backlight unit.

SUMMARY OF THE INVENTION

To accomplish the above object, the present invention provides a backlight unit comprising: a quadrilateral light guide plate and a plane light output from a light-output surface of the light guide plate; and a substrate comprises a plurality of light-emitting diodes which output a light to an edge of the light guide plate; and an inner frame which surround the light guide plate; and an outer frame which surround the inner frame and the substrate; a plurality of rubber members which press the light guide plate to the light-emitting diodes; wherein a side of the inner frame is opposite to the light-emitting diodes, and two corners are formed edges of the side; and the rubber member is placed the each corners; and wherein the rubber member comprises a cylindrical part; and wherein the cylindrical part is projected inside of the inner frame. And the present invention provides a liquid crystal display device having the backlight unit as above described.

According to the present invention, the plurality of rubber members press the light guide plate to the light-emitting diodes. For room temperature, the light guide plate is pressed by the plurality of rubber members, and the light guide plate is certain pressed to the light-emitting diodes, and the light guide plate is supported by the plurality of rubber members constantly. When the room temperature rose to high temperature, the plurality of rubber members absorbed for the inner frame expansions by high temperature. Thus, the light guide plate is supported by the plurality of rubber members constantly. In case of the rubber member is deformed by high temperature, the rubber member is quickly returned with temperature dropped. More over, it is easy to assemble the light guide plate. That is, set the plurality of rubber members into the given places of the plastic frame, and then push the light guide plate into the inner frame. Also built in performance is well.

According to the present invention of the backlight unit, the plurality of rubber members press the light guide plate to the light-emitting diodes. Thus, the light guide plate is supported constantly. Therefore, the backlight unit is certain pressing the light guide plate to the light-emitting diodes without being influenced by external environment, and prevent to occurs image disqualify such as uneven luminance and easy to assemble the light guide plate. More over, it is easy to assemble the light guide plate. In addition, the liquid crystal display (LCD) device having the same invention of the backlight unit, the LCD device is excellent image view and getting high reliability.

The above and other objects, characteristic features and advantages of the present invention will become apparent to those skilled in the art from the description to be given herein below with reference to the accompanying drawings.

BRIEF DESCRIPTION OF THE DRAWINGS

FIG. 10A and FIG. 10B are shown a side section views of a prior art liquid crystal display device and as shown relations between a light output condition and a distance that the distance is between a light guide plate and a LED, wherein FIG. 10A is shown in case of the distance is large, and wherein FIG. 10B is shown in case of the distance is small.

DETAILED DESCRIPTION OF THE PREFERRED EMBODIMENT

An embodiment of a backlight unit as surface light source function and the crystal display device having the backlight unit according to the present invention will be described hereinafter with reference to the drawings.

Figure 1:
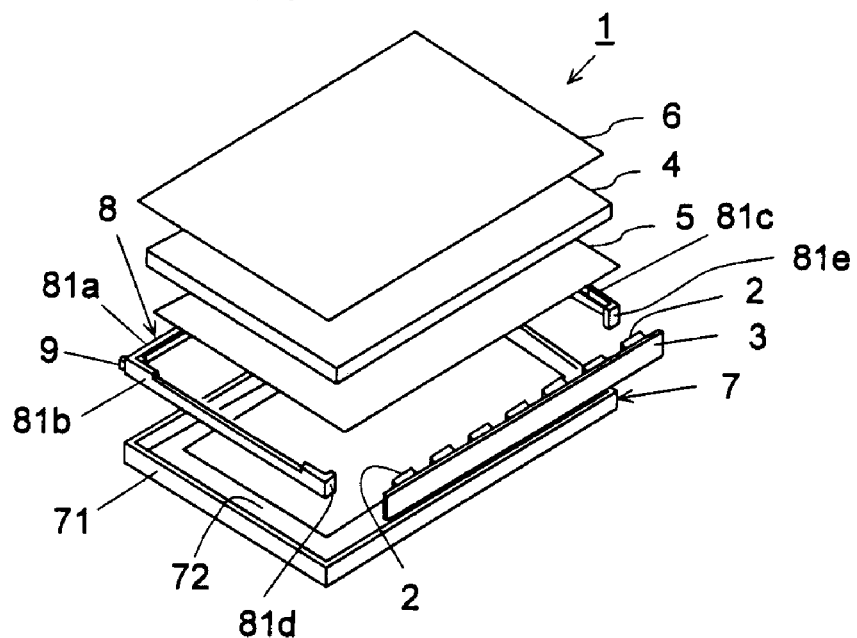
FIG. 1 is shown an exploded perspective view of a backlight unit according to the embodiment.

FIG. 1 is shown an exploded perspective view of a backlight unit 1 according to the present invention. A backlight unit 1 as an embodiment comprises a flexible circuit board 3 which having a plurality of light-emitting diodes (LEDs) 2, a light guide plate 4 as flat board shape, a reflection sheet 5, and an optical sheet 6 (See FIG. 1). A plurality of light-emitting diodes (LEDs) 2 output a light to an edge of the light guide plate 4, and the plane light output from a light-output surface of the light guide plate 4.

The plural light-emitting diodes (LEDs) 2 are mounted on a flexible circuit board 3. The flexible circuit board 3 is set along to a line as a long side of the light guide plate 4 (FIG. 1). Then, the LEDs 2 are set along to a line of the light guide plate 4. The light guide plate 4 is piled on a reflection sheet 5. An optical sheet 6 is piled on the light guide plate 4. A light output from LEDs 2 is input to the edge of the light guide plate 4 directly, and/or, a light output from LEDs 2 is reflected by a reflection sheet 5 and then input to the edge of the light guide plate 4. The light through the light guide plate 4 and an optical sheet 6, and the light is output to a liquid crystal display panel 21. Thus, the embodiment backlight unit 1 is used an edge light method.

Embodiment backlight unit 1 is consisted combination of an outer frame 7 and an inner frame 8. Around of the light guide plate 4, a reflection sheet 5, and an optical sheet 6 is supported the combination of the outer frame 7 and the inner frame 8, and those parts are installed (refer to FIG. 1).

According to embodiment, the outer frame 7 is made of metal such a stainless steel or titanium alloy. The inner frame 8 is made of plastic such as polymer plastic. The outer frame 7 comprises an outline wall 71 and a base place 72. The outer frame 7 is rectangular shape and formed a window at the base place 72. The outline wall 71 is stand vertically to surface of the base place 72. Then, the outline wall 71 is stand vertically to the light-output surface of the light guide plate 4.

Figure 2:
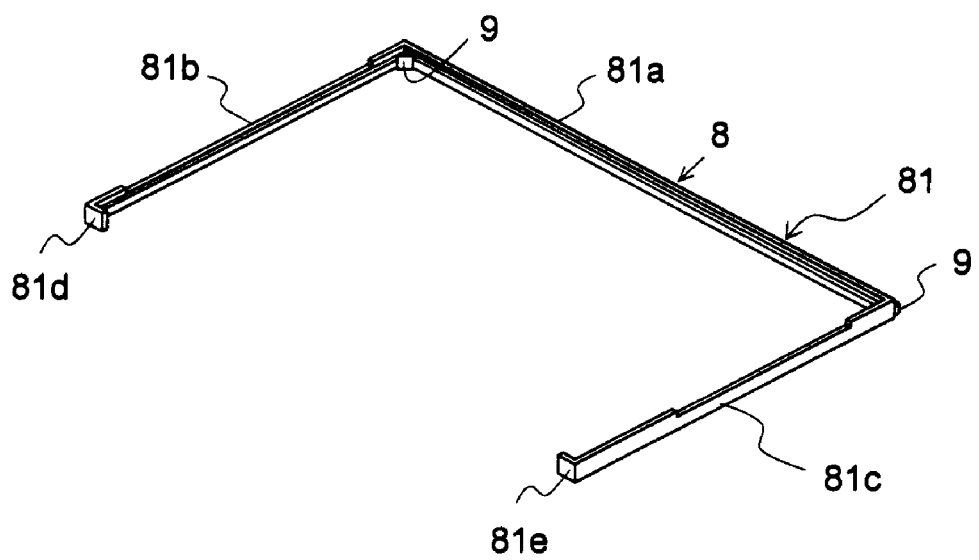
FIG. 2 is shown a schematic perspective view of an inner frame belongs to the backlight unit according to the embodiment.

FIG. 2 is shown a schematic perspective view of an inner frame 8 belongs to the backlight unit 1 according to the embodiment. The inner frame 8 comprises an outline wall 81 which support to three sides of the light guide plate 4. The inner frame 8 is rectangular shape but cut off a part of side. The flexible circuit board 3 is set at the cut part of the inner frame 8. The inner frame 8 comprises an outline wall 81 and the outline wall 81 is into the outer frame 7. The outline wall 81 consists of a long side wall 81a and two short side wall 81b and 81c. An end of the short side wall 81b is connected a left end of the long side wall 81a as right angle (See FIG. 2). The other end of the short side wall 81b consists with a very short wall 81d as right angle towards a short side wall 81c. An end of the short side wall 81c is connected a right end of the long side wall 81a as right angle (See FIG. 2). The other end of the short side wall 81c consists with a very short wall 81e as right angle towards a short side wall 81b.

Figure 3:
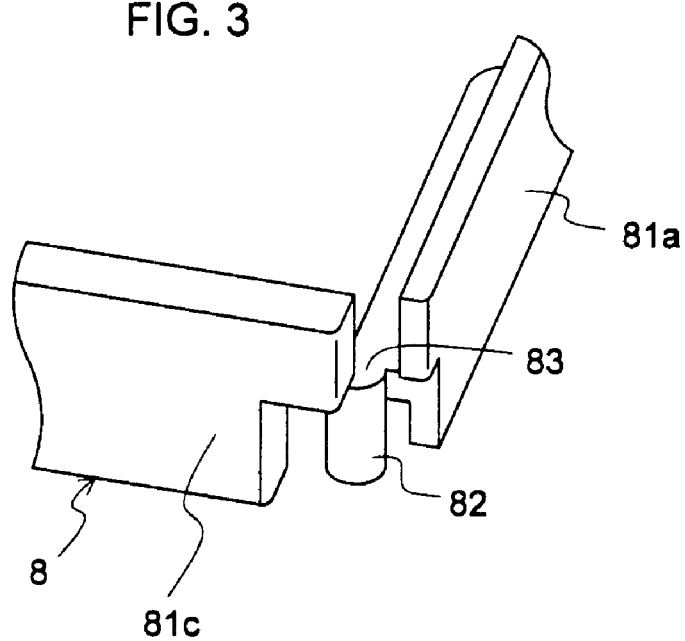
FIG. 3 is shown an expanded perspective view of a support pin formed on the inner frame according to the embodiment.

FIG. 3 is shown an expanded perspective view of a support pin 82 formed on the inner frame 8 according to the embodiment. A side of the inner frame 8 is opposite to the light-emitting diodes 2, and two corners are formed edges of the side, and the support pin 82 is placed the each corners. Plural support pins 82 are projected toward to bottom of the inner frame 8 (See FIG. 3). An end of the long side wall 81a is connected to an end of the short side wall 81c, right angle and makes a corner. For the corner, surround of the support pin 82 that is cut a part of side wall 81a, 81c. Thickness of the support pin 82 is shorter than the thickness of the inner frame 8. Height of a surface step 83 is lower than the top of the inner frame 8, and height of the back of the support pin 82 is within a space that is the cut part of side wall 81a, 81c. Thus, the support pin 82 is formed on a surface step 83 of the inner frame 8. Then, the end of the long side wall 81a is connected with the end of the short side wall 81b, 81c by through the surface step 83.

Figure 4:
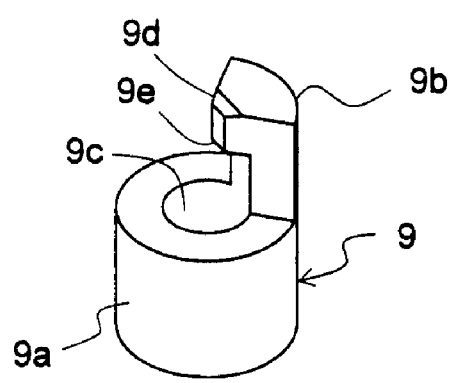
FIG. 4 is shown a perspective view of a rubber member belongs to the backlight unit according to the embodiment.
Figure 5:
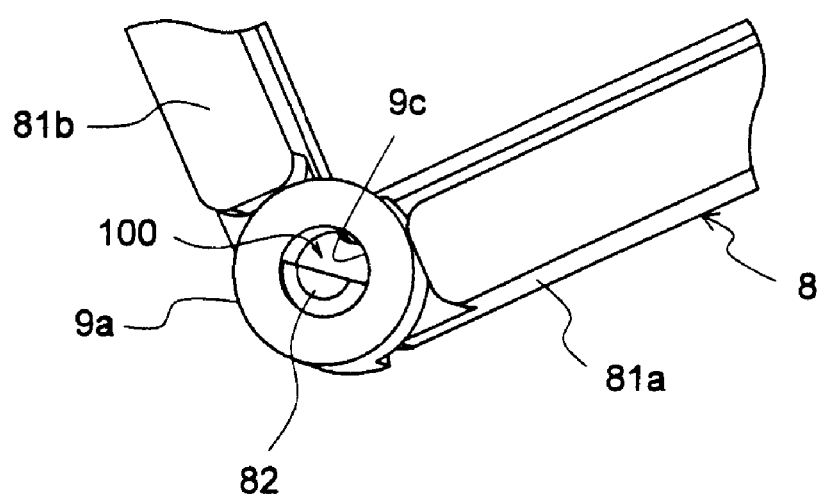
FIG. 5 is shown a bottom side perspective view of a rubber member attached conditions belongs to the backlight unit according to the embodiment.

FIG. 4 is shown a perspective view of a rubber member 9 belongs to the backlight unit 1 according to the embodiment. FIG. 5 is shown a bottom side perspective view of a rubber member 9 attached conditions belongs to the backlight unit 1 according to the embodiment. The backlight unit 1 comprising a plurality of rubber members 9 which press the light guide plate 4 to the light-emitting diodes 2. The rubber member 9 is made of rubber materials such a silicone rubber. The rubber member 9 functions as a rubber spring. The rubber member 9 comprises a press part 9a as cylindrical shape and a projection part 9b that is formed on the press part 9a (See FIG. 4). Outer diameter of the press part 9a is larger than width between inside of the 81a, 81b, or 81c and outside of the 81a, 81b, or 81c (See FIG. 5). The press part 9a is cut a part of the rubber member 9, and the press part 9a is set the space that is the cut part of side wall 81a and 81b, or the cut part of side wall 81a and 81c (See FIG. 5).

The cylindrical press part 9a is formed a through-hole 9c at the center. The support pin 82 is inserted to the through-hole 9c and the rubber member 9 is set to the inner frame 8 (See FIG. 5). Outside of the press part 9a is projected from inside of the 81a, 81b, or 81c. Thus, Outside of the press part 9a is attached side of the light guide plate 4. Therefore, the light guide plate 4 is pressing to the LED 2 by the plural rubber members.

As above described is basic structure of the backlight unit 1. The structure of the backlight unit 1 that is prefer to set the light guide plate 4 near the light-emitting diodes 2. Therefore, embodiment backlight unit 1 comprises a plurality of rubber members 9 which press the light guide plate 4 to the light-emitting diodes 2.

A hook 9d is formed on top of the projection part 9b. The hook 9d is projected to inside of the rubber member 9, and bottom side 9e of the hook 9d is hook side (See FIG. 4). The hook 9d is hooked surface step 83 of the inner frame 8 when the cylindrical press part 9a is inserted the support pin 82. Thus, the hook 9d prevents to drop the rubber member 9 from the support pin 82. Further, combination of the projection part 9b and the hook 9d prevent to turn the rubber member 9 around of the support pin 82. The cylindrical press part 9a is made of a silicone rubber. Thus, the cylindrical press part 9a prevents to drop itself by frictional force between the silicone rubber and the support pin 82. Moreover, the hook 9d prevents to drop the rubber member 9 certainly.

Figure 6:
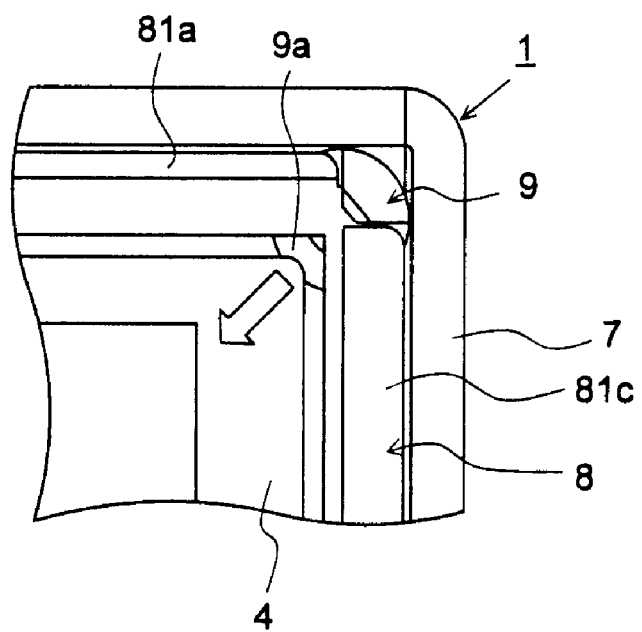
FIG. 6 is shown an expanded plane view of a rubber member attached condition belongs to the backlight unit according to the embodiment.
Figure 7:
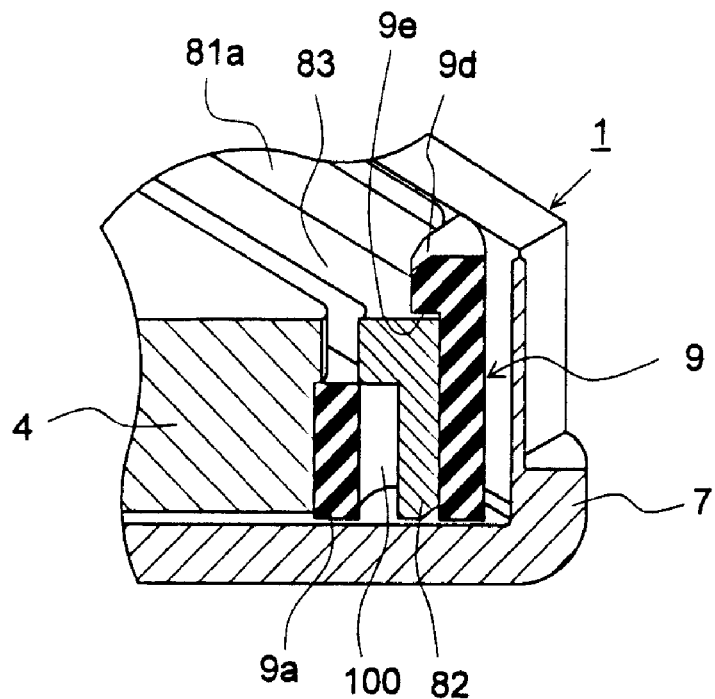
FIG. 7 is shown an expanded perspective section view of a rubber member attached condition belongs to the backlight unit according to the embodiment.
Figure 8:
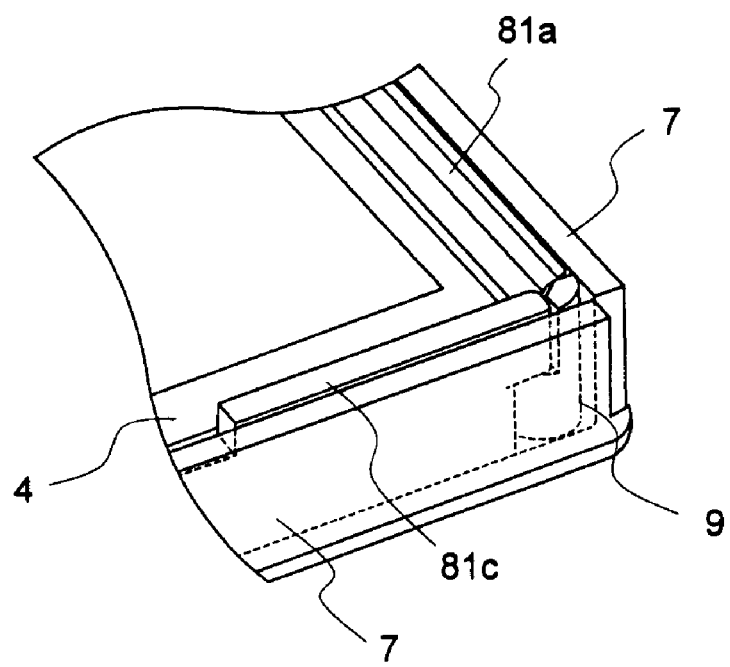
FIG. 8 is shown an expanded perspective view of a rubber member attached condition belongs to the backlight unit according to the embodiment.

FIG. 5 is shown a bottom side perspective view of attached conditions for the inserted rubber member 9 and the support pin 82. FIG. 6 is shown a plane view of attached conditions for the outer frame 7 and the inner frame 8. FIG. 7 is shown an expanded perspective section view of a rubber member 9 attached conditions. FIG. 8 is shown an expanded perspective view of a rubber member 9 attached conditions.

According to shape of the support pin 82 is combination full cylindrical shape and half cylindrical shape. That is, the support pin 82 is the full cylindrical shape at side of the surface step 83, and the support pin 82 is half cylindrical shape at side of tip (See FIG. 5, FIG. 7). Then, when the rubber member 9 inserted the support pin 82, a space 100 is formed between the support pin 82 and the cylindrical press part 9a (See FIG. 5). The space 100 is adjusting for elastic force of the cylindrical press part 9a. That is, the shape of the support pin 82 confront to the cylindrical press part 9a is formed the half cylindrical shape, and then, the half cylindrical shape of the support pin 82 adjust to the elastic force of the cylindrical press part 9a proper range. When needed large elastic force, formed the support pin 82 full cylindrical shape, for example.

The cylindrical rubber member 9 is a fine small part. If the rubber member 9 is dropped after assembles, difficult to find and re-assemble the dropped rubber member 9. The hook 9d is hooked surface step 83 of the inner frame 8 when the cylindrical press part 9a is inserted the support pin 82. Thus, the hook 9d prevents to drop the rubber member 9 from the support pin 82. Further, combination of the projection part 9b and the hook 9d prevent to turn the rubber member 9 around of the support pin 82. Then, the rubber member 9 attaches the light guide plate 4 certainly. Therefore, the light guide plate 4 is supported constantly by the cylindrical rubber member s 9.

Regarding assemble method of the cylindrical rubber member 9 to the inner frame 8 that is following steps. First, set the rubber member 9 to the support pin 82. When the center through-hole 9c is inserted the support pin 82, the projection part 9b is bent toward the outside. The support pin 82 is inserted the center through-hole 9c, and the projection part 9b return original positions by elastic restoring force of it. Then, the rubber members 9 are hooked to the inner frame 8. Next, set the inner frame 8 into the outer frame 7. Head of the inner frame 8 is a side of the rubber members 9 settled, preferably. Next, set the light guide plate 4 into the inner frame 8. It is easy to set the light guide plate 4 what means attach a side of the light guide plate 4 to the outside of the rubber members 9, and then, push and insert the light guide plate 4. Then, the light guide plate 4 is supported constantly by the cylindrical rubber members 9, and the light guide plate 4 is assembled into the inner frame 8.

The cylindrical rubber members 9 are attached corners of the light guide plate 4 one-to-one correspond. Then, the light guide plate 4 is pushed the arrow direction in FIG. 6 by the rubber member 9. As the result, structure of the backlight unit is certain pressing the light guide plate 4 to the LED 2. And the corners of the light guide plate 4 are chamfered at the top side, preferably. Then, attach area between the light guide plate 4 and the cylindrical press part 9a is enlarged, and the cylindrical press part 9a pressing the light guide plate 4, constantly. And the corners of the light guide plate 4 are rounded is acceptable to use.

Also the cylindrical rubber members 9 are attached an inside of the outer frame 7. That is, a side of the cylindrical rubber member 9 is attached corners of the light guide plate 4, and opposite side of the cylindrical rubber member 9 is attached an inside of the outer frame 7, at once. Then, the plural cylindrical rubber members 9 are sandwiched between the inner frame 8 and the outer frame 7. Therefore, the plural cylindrical rubber members 9 prevent to shaky between the inner frame 8 and the outer frame 7.

As above embodiment, the cylindrical rubber member 9 is set to the each end of the long side wall 81a, and the plural cylindrical rubber members 9 presses the light guide plate 4 to the light-emitting diodes 2, and positioning the light guide plate 4 to given position in the inner frame 8. It is possible to set the rubber springs on the middle area between the light-emitting diodes 2 and a side of the long side wall 81a that means the middle positions of the side wall 81a and 81c. It is possible to set the additional rubber members on the middle positions of the side wall 81a and 81c, additions to above embodiment. Those layouts of the rubber members 9 perform as pressing work and positioning work as well.

The present invention provides a liquid crystal display device comprises the backlight unit 1 as above described embodiment. And the backlight unit 1 is a lighting unit throws a light on a liquid crystal display panel from behind. According to the present invention will be described hereinafter with reference to the drawings.

Figure 9:
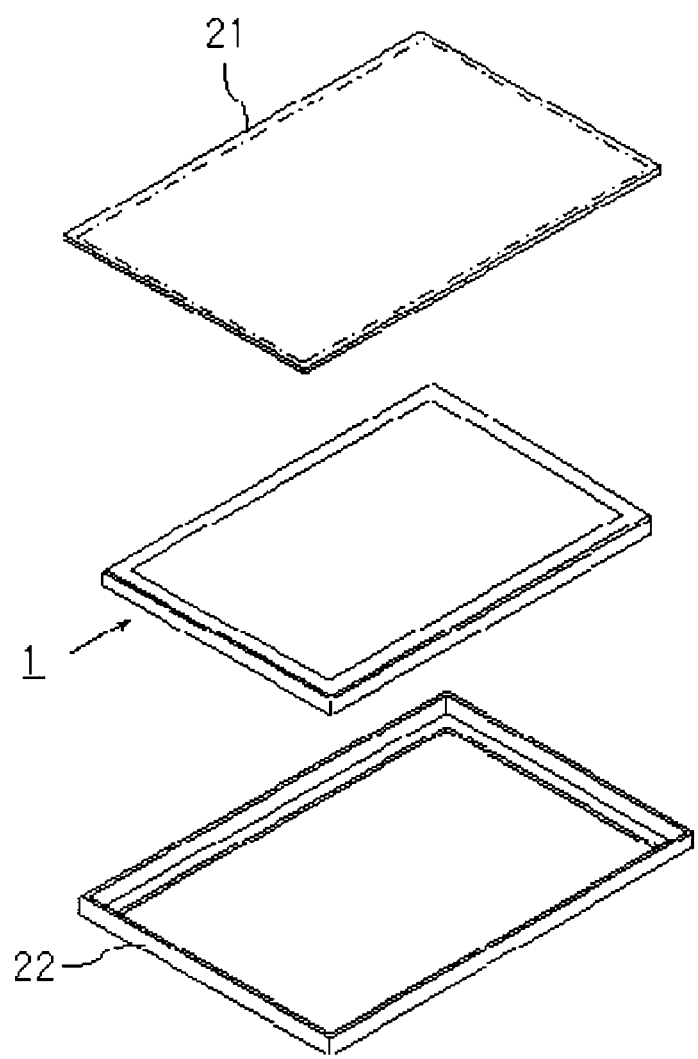
FIG. 9 is shown an exploded perspective view of a liquid crystal display device according to the embodiment.

FIG. 9 is shown an exploded perspective view of a liquid crystal display device according to the embodiment. According to the present invention, embodiment liquid crystal display (LCD) device comprises the backlight unit 1 as above described. That is, embodiment liquid crystal display device comprising; a liquid crystal display panel 21; and the backlight unit 1 under the liquid crystal display panel 21; and a outside frame 22 which is made of metal, polymer plastic, or composite of metal and polymer plastic, and wherein the frame 22 holding the liquid crystal display panel 21 and the backlight unit 1.

The liquid crystal display panel 21 comprises an array substrate, an opposed substrate and a liquid crystal material inserted between the two substrates. The array substrate is formed with pixel electrodes corresponding to display pixels and a switching device (thin-film transistor) in matrix form. Also, on the liquid crystal display panel 21, signal lines for transmitting signals to the pixel electrodes and gate lines for transmitting switching signals to the thin-film transistor that is the switching device are wired to be orthogonal to each other. On the other hand, the opposed substrate is provided substantially over the entire surface thereof with opposed electrodes formed of a transparent electrode material (ITO, for example) and with color filter layers corresponding to pixels. Furthermore, polarization plates are bonded to the outer surfaces of the array and opposed substrates, respectively, so that their polarization axes may be perpendicular to each other.

To the liquid crystal display panel 21 is having the configuration described above, a circuit board for supplying operation signals to the liquid crystal display panel 21 is electrically connected. The switching device is operated based on the operation signals transmitted from the circuit board to display images. The region in which the images are displayed is a display region and, therefore, the liquid crystal display panel 21 has a display region in which plural display pixels are arrayed.

The backlight unit 1 as above described is incorporated of the liquid crystal display panel 21 into the liquid crystal display device. The plane light output from a light-output surface of the light guide plate 4. That is, a light output from a plurality of light-emitting diodes 2 is input to the edge of the light guide plate 4 and input to the edge of the light guide plate 4, and the light through the light guide plate 4 and an optical sheet 6, and the light output to a liquid crystal display panel 21. To the liquid crystal display panel 21, passed through the light guide plate 4 and thereafter irradiated onto the liquid crystal display panel 21. The irradiated light is transmitted to the light guide plate 4 to display images, such as letters, pictures, etc., on the liquid crystal display panel 21 with predetermined brightness. According to the embodiment backlight unit 1, certain pressing the light guide plate 4 to the light-emitting diodes 2, and prevent to occurs image disqualify such as uneven luminance.

Figure 10A:
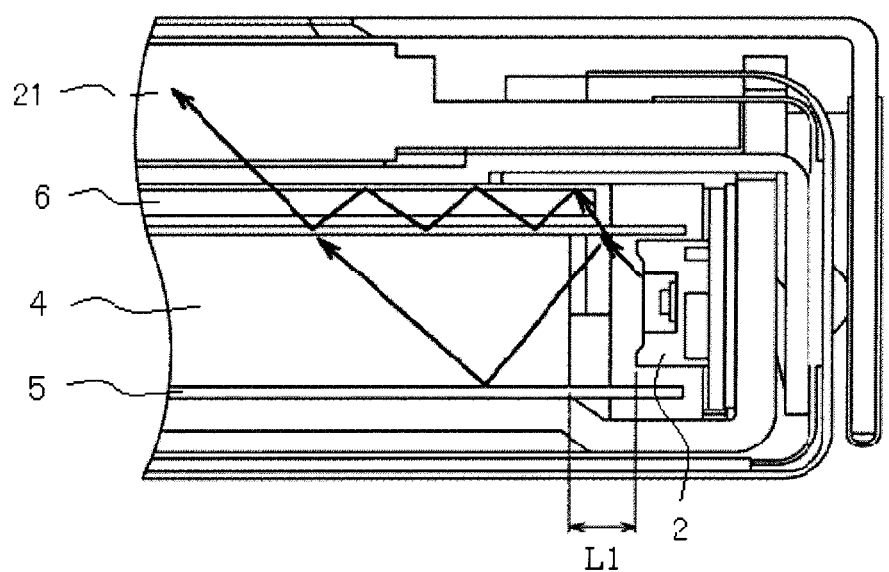

FIG. 10A and FIG. 10B are shown a side section views of a prior art liquid crystal display device and as shown relations between a light output condition and a distance that the distance is between a light guide plate and a plurality of light-emitting diodes 2, wherein FIG. 10A is shown in case of the distance L1 is large, and wherein FIG. 10B is shown in case of the distance L2 is small. In case of the distance L1 is large that cause of the light guide plate 4 is not pressed enough, an optical sheet 6 is easy to input a light directory and the light is reflected far to the light-emitting diodes 2. Then, occurs image disqualify such as uneven luminance. Meanwhile, in case of the distance L2 is large that cause of the light guide plate 4 is pressed enough, most of the light input to the light guide plate 4 directories and the other light which in the optical sheet 6 is reflected near to the light-emitting diodes 2. Then, image disqualify such as uneven luminance doesn't occurs. According to the embodiment backlight unit 1, certain pressing the light guide plate 4 to the light-emitting diodes 2, and prevent to occurs image disqualify such as uneven luminance such as FIG. 10B as described.

What is claimed is:

1. A backlight unit comprising:
    a quadrilateral light guide plate for outputting a planar light from a light-output surface of the light guide plate;
    a substrate comprising a plurality of light-emitting diodes which output a light to an edge of the light guide plate;
    an inner frame surrounding the light guide plate and having a side facing the light-emitting diodes;
    an outer frame disposed outside of and surrounding the inner frame and the substrate; and
    a rubber member disposed at a corner of the inner frame and comprising a cylindrical part projecting outside of an inner surface and an outer surface of the inner frame, the cylindrical part being in contact with:
        the light guide plate so as to press the light guide plate toward the light-emitting diodes, and
        an inner surface of the outer frame.

2. The backlight unit according to claim 1, wherein the inner frame comprises a support pin,
    the cylindrical part comprises a through-hole; and
    the support pin is positioned within the through-hole.

3. The backlight unit according to claim 2, wherein the support pin has a cylindrical portion and a half cylindrical portion, the half cylindrical portion being positioned within the through-hole so as to form a space between the half cylindrical portion and the cylindrical part, the space being closer to the light guide plate than to the outer frame.

4. The backlight unit according to claim 2, wherein the rubber member comprises a hook formed on the cylindrical part, and engaging the inner frame.

5. The backlight unit according to claim 1, wherein the cylindrical part has a diameter greater than a width of the inner frame.

6. The backlight unit according to claim 1, wherein the cylindrical part is made of silicone rubber.

7. A liquid crystal display device comprising:
    a liquid crystal display panel; and
    a backlight unit under the liquid crystal display panel, the backlight unit comprising:
        a quadrilateral light guide plate for outputting a planar light from a light-output surface of the light guide plate;
        a substrate comprising a plurality of light-emitting diodes which output a light to an edge of the light guide plate;
        an inner frame surrounding the light guide plate and having a side facing the light-emitting diodes;
        an outer frame disposed outside of and surrounding the inner frame and the substrate; and
        a rubber member disposed at a corner of the inner frame and comprising a cylindrical part projecting outside of an inner surface and an outer surface of the inner frame, the cylindrical part being in contact with:
            the light guide plate so as to press the light guide plate toward the light-emitting diodes, and
            an inner surface of the outer frame.

* * * * *